US010033624B2

(12) United States Patent
Rolf et al.

(10) Patent No.: US 10,033,624 B2
(45) Date of Patent: Jul. 24, 2018

(54) METHOD AND APPARATUS FOR PROBE-BASED ROUTING

(71) Applicant: HERE Global B.V., Veldhoven (NL)

(72) Inventors: Daniel Rolf, Berlin (DE); Björn Karge, Singapore (SG); Ullrich Praetz, Alsfeld (DE); Prokop Jehlicka, Oberursel (DE)

(73) Assignee: HERE Global B.V., Veldhoven (NL)

(*) Notice: Subject to any disclaimer, the term of this patent is extended or adjusted under 35 U.S.C. 154(b) by 410 days.

(21) Appl. No.: 14/080,569

(22) Filed: Nov. 14, 2013

(65) Prior Publication Data

US 2015/0134850 A1    May 14, 2015

(51) Int. Cl.
G01C 21/32    (2006.01)
H04L 12/733   (2013.01)
G01C 21/34    (2006.01)

(52) U.S. Cl.
CPC ............ H04L 45/126 (2013.01); G01C 21/32 (2013.01); G01C 21/3492 (2013.01)

(58) Field of Classification Search
CPC .......................... G01C 21/32; G01C 21/3492
See application file for complete search history.

(56) References Cited

U.S. PATENT DOCUMENTS 5,270,937 A * 12/1993 Link ..................... G01C 21/30
                                                  340/995.19
5,410,485 A *  4/1995 Ichikawa ........... G01C 21/3446
                                                  340/995.19

(Continued)

FOREIGN PATENT DOCUMENTS

GB    2272520 A  *  5/1994 ......... G01C 21/3655
WO    2010074668 A1    7/2010

(Continued)

OTHER PUBLICATIONS

B. Blackwell, The Use of Range-Tree Spatial Indexing to Speed Up GIS Data Retrieval, <http://mapcontext.com/autocarto/proceedings/auto-carto-8/ pdf/the-use-o f-range- tree-spatial-indexing-to-speed-gis-data - retrieval.pdf> >.*

(Continued)

Primary Examiner — David Lazaro
Assistant Examiner — Robert Shaw
(74) Attorney, Agent, or Firm — Ditthavong & Steiner, P.C.

(57) ABSTRACT

An approach is provided for providing routing calculations and route guidance based on geographic positioning and/or other sensor data from one or more mobile devices independent of map data. A routing platform processes and/or facilitates a processing of one or more probe data samples associated with at least one mobile device to determine one or more device tracks. The routing platform processes and/or facilitates a processing of the one or more device tracks to determine at least one tessellation, wherein the at least one tessellation is a subdivision of a plane or sphere into one or more tiles and a plurality of segments. The routing platform further determines one or more relationships between one or more of the plurality of segments based, at least in part, on a mapping of the one or more device tracks against the at least one tessellation.

20 Claims, 13 Drawing Sheets

(56) References Cited

U.S. PATENT DOCUMENTS

| | | | | |
|---|---|---|---|---|
| 5,802,492 | A * | 9/1998 | DeLorme | G01C 21/3476 340/990 |
| 6,240,364 | B1 * | 5/2001 | Kerner | G01C 21/3492 340/988 |
| 6,249,740 | B1 * | 6/2001 | Ito | G01C 21/34 340/910 |
| 7,363,126 | B1 * | 4/2008 | Zhong | G01C 21/3484 340/992 |
| 8,306,747 | B1 * | 11/2012 | Gagarin | G01C 7/04 701/408 |
| 9,116,011 | B2 * | 8/2015 | Lynch | G01C 21/3638 |
| 9,507,808 | B2 * | 11/2016 | Fischer | G06F 17/30289 |
| 2002/0161513 | A1 * | 10/2002 | Bechtolsheim | G01C 21/3667 701/454 |
| 2006/0025923 | A1 * | 2/2006 | Dotan | G01C 21/32 701/409 |
| 2009/0093959 | A1 * | 4/2009 | Scherzinger | G01C 21/165 701/470 |
| 2011/0224893 | A1 * | 9/2011 | Scofield | G01C 21/3492 701/119 |
| 2012/0022781 | A1 * | 1/2012 | Wilson | G01C 21/3469 701/410 |
| 2012/0116678 | A1 * | 5/2012 | Witmer | G01C 21/32 702/5 |
| 2012/0276847 | A1 * | 11/2012 | Peterson | G01S 5/0027 455/41.2 |
| 2013/0073197 | A1 * | 3/2013 | Hirai | G01C 21/3673 701/428 |
| 2013/0117322 | A1 * | 5/2013 | Fischer | G06F 17/30289 707/792 |
| 2013/0245943 | A1 * | 9/2013 | Hiestermann | G01C 21/32 701/533 |
| 2013/0282264 | A1 * | 10/2013 | Bastiaensen | G01C 21/3492 701/119 |

FOREIGN PATENT DOCUMENTS

| | | | |
|---|---|---|---|
| WO | 2010081836 A1 | 7/2010 | |
| WO | WO 2010074668 A1 * | 7/2010 | ......... G01C 21/3469 |
| WO | WO 2010081836 A1 * | 7/2010 | ............ G01C 21/32 |
| WO | 2010105714 A1 | 9/2010 | |
| WO | 2012157026 A1 | 11/2012 | |

OTHER PUBLICATIONS

Office Action for corresponding European Patent Application No. 14190186.8-1557, dated Sep. 2, 2015, 17 Pages.

Office Action for corresponding European Patent Application No. 14 190 186.8-1557, dated Aug. 19, 2016, 5 pages.

Partial European Search Report for corresponding European Patent Application No. 14190186.8 dated Apr. 15, 2015, 8 pages.

R. J. Herring, "Real-Time Traffic Modeling and Estimation with Streaming Probe Data using Machine Learning," Doctoral Dissertation, 2010, 39 pages.

X. Liu et al., "Mining Large-Scale, Sparse GPS Traces for Map Inference: Comparison of Approaches," Jun. 6, 2012, HP Laboratories, 10 pages.

S. Jabbar, "GPS-based Navigation in Static and Dynamnic Environments" Master's Thesis Presentation, Jul. 10, 2003, 35 pages.

L. Cao et al., "From GPS Traces to a Roundtable Road Map," Sep. 14, 2009, 10 pages.

* cited by examiner

METHOD AND APPARATUS FOR PROBE-BASED ROUTING

BACKGROUND

Service providers and device manufacturers (e.g., wireless, cellular, etc.) are continually challenged to deliver value and convenience to consumers by, for example, providing compelling network services. One area of interest has been the development of mapping and/or navigation applications that provide users of mobile devices (e.g., mobile phones, tablets, phablets, personal navigation devices (PNDs), etc.) with substantially real-time location-based information to assist them with their travels. In particular, users often want to know the shortest path (e.g., in terms of distance, time, fuel consumption, etc.) between an origin (e.g., a home) and a particular destination (e.g., an office, a restaurant, etc.). Currently, finding a route through a road network, for example, can be described by the common single-source path problem. For example, from the road network, an abstract model (e.g., a directed graph) can be generated where junctions are most often represented by nodes and streets are most often represented by edges and each is assigned a cost-function describing the weight for traversing the element. Consequently, the wanted solution of the shortest path problem is a path through the graph from an origin node or edge to a destination node or edge where the sum of all costs is minimal. Such a path with minimal cost is also referred to as shortest path through the graph.

However, current routing calculations are often inaccurate due to the underlying static network model and the current method of detecting of travel time. Firstly, because current solutions are generally based on a static graph created upon a road network, when the network changes from time to time (e.g., as a result of construction, road closure, etc.), such routing calculations can quickly become outdated and therefore inaccurate. Moreover, updating/maintaining static routing models ("routable road maps") is generally time consuming and costly. Secondly, there are several issues that bias current travel time estimations, for example, the accuracy of traffic state detection on edges and the accuracy of travel time information on nodes of the static graph model. In particular, detection of current travel times on the edges is largely done by local detectors embedded in selected locations in the road surface. Consequently, resulting travel times over roads and the abstracted model have to be estimated from the local detection by extrapolation rather than using real-time transit time measurement results. In addition, the real-time travel time estimates and traffic incidents broadcast (e.g., via Traffic Message Channel (TMC, ISO 14819)) mostly cover important and higher-ranked roads only. Therefore, there is also a lack of traffic data for inner-TMC-location edges and interchanges not mapped by the TMC. Accordingly, service providers and device manufacturers face significant technical challenges in offering a service that provides routing calculations based on geographical positioning data from one or more mobile devices (i.e., probes) independent of (possibly outdated) map data and (imprecise/incomplete) TMC data.

SOME EXAMPLE EMBODIMENTS

Therefore, there is a need for an approach for providing routing calculations and route guidance based on geographic positioning and/or other sensor data from one or more mobile devices independent of map data.

According to one embodiment, a method comprises processing and/or facilitating a processing of one or more probe data samples associated with at least one mobile device to determine one or more device tracks. The method also comprises processing and/or facilitating a processing of the one or more device tracks to determine at least one tessellation, wherein the at least one tessellation is a subdivision of a plane or sphere into one or more tiles and a plurality of segments. The method further comprises determining one or more relationships between one or more of the plurality of segments based, at least in part, on a mapping of the one or more device tracks against the at least one tessellation.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more probe data samples associated with at least one mobile device to determine one or more device tracks. The apparatus is also process and/or facilitate a processing of the one or more device tracks to determine at least one tessellation, wherein the at least one tessellation is a subdivision of a plane or sphere into one or more tiles and a plurality of segments. The apparatus is further caused to determine one or more relationships between one or more of the plurality of segments based, at least in part, on a mapping of the one or more device tracks against the at least one tessellation.

According to another embodiment, a computer-readable storage medium carries one or more sequences of one or more instructions which, when executed by one or more processors, cause, at least in part, an apparatus to process and/or facilitate a processing of one or more probe data samples associated with at least one mobile device to determine one or more device tracks. The apparatus is also process and/or facilitate a processing of the one or more device tracks to determine at least one tessellation, wherein the at least one tessellation is a subdivision of a plane or sphere into one or more tiles and a plurality of segments. The apparatus is further caused to determine one or more relationships between one or more of the plurality of segments based, at least in part, on a mapping of the one or more device tracks against the at least one tessellation.

According to another embodiment, an apparatus comprises means for processing and/or facilitating a processing of one or more probe data samples associated with at least one mobile device to determine one or more device tracks. The apparatus also comprises means for processing and/or facilitating a processing of the one or more device tracks to determine at least one tessellation, wherein the at least one tessellation is a subdivision of a plane or sphere into one or more tiles and a plurality of segments. The apparatus further comprises means for determining one or more relationships between one or more of the plurality of segments based, at least in part, on a mapping of the one or more device tracks against the at least one tessellation.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing routing calculations and route guidance based on geographic positioning and/or other sensor data from one or more mobile devices independent of map data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
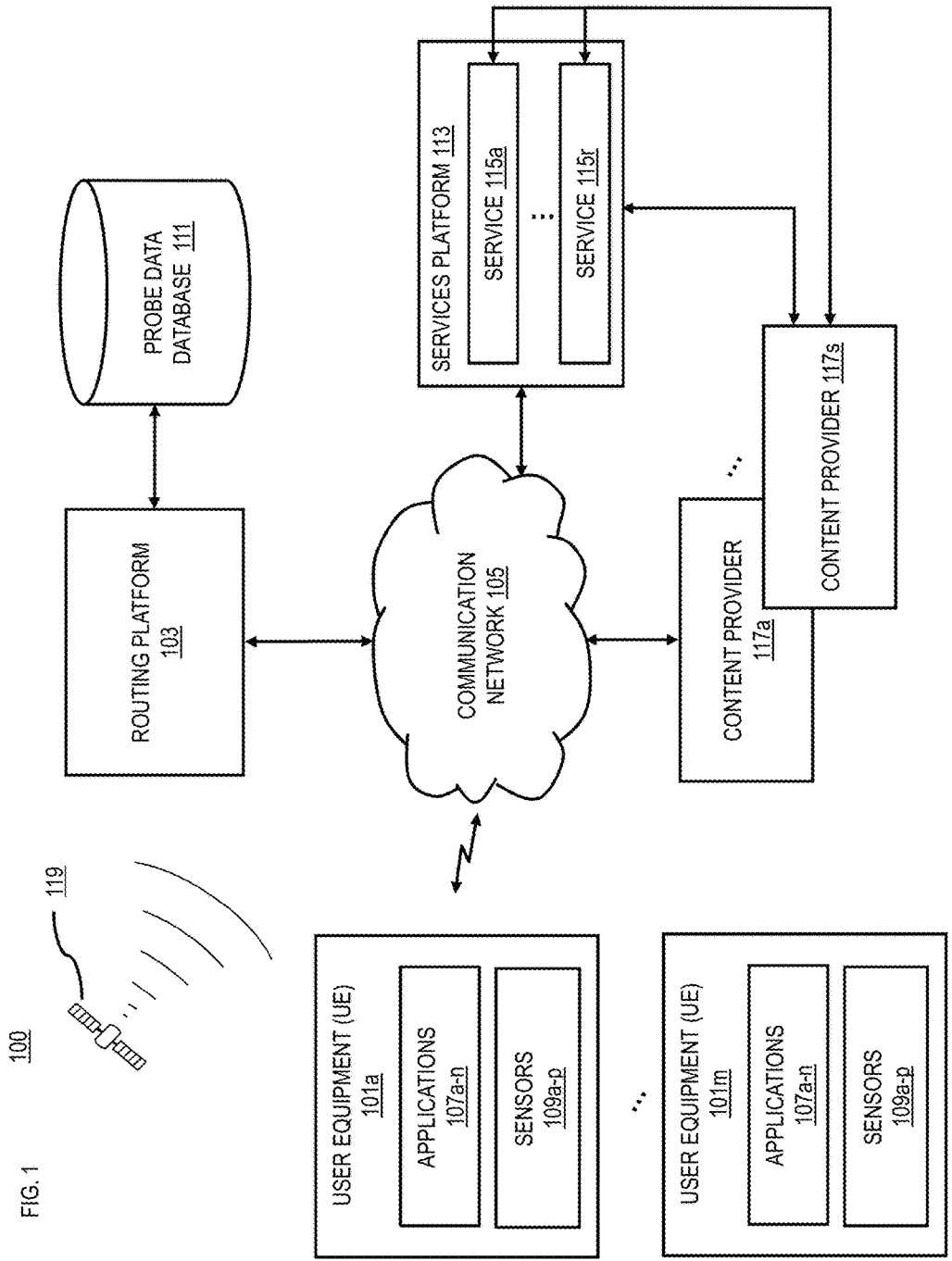
FIG. 1 is a diagram of a system capable of providing routing calculations and route guidance based on geographic positioning and/or other sensor data from one or more mobile devices independent of map data, according to one embodiment.

FIG. 1 is a diagram of a system capable of providing routing calculations and route guidance based on geographic positioning and/or other sensor data from one or more mobile devices independent of map data, according to one embodiment. As previously discussed, one area of interest among service providers and device manufacturers has been the development of mapping and/or navigation applications that provide users of mobile devices with substantially real-time location-based information to assist them with their travels. As also previously discussed, finding a route through a road network can be described by the common single-source shortest path problem. From the road network, an abstract model (e.g., a directed graph) can be generated where junctions are represented by nodes and streets are represented by edges. In some cases, an inverse graph can be created where streets are represented by nodes and turn relations at a junction are represented by edges. More specifically, each edge and node in the graph is assigned a cost-function describing the weight for traversing the element. Consequently, the wanted solution of the shortest path problem is a path through the graph from an origin node or edge to a destination node or edge where the sum of all costs is minimal.

The routing problem in traffic engineering can be solved with cost-functions like length of an edge for shortest path routing and estimated travel time for fastest routing. However, more complex functions can also be used including fuel consumption or favored road types (e.g., roads without tolls). In common routing problems another parameter is often added to the model, a dynamic real-time traffic state or traffic pattern changing all travel times that are required to traverse through the graph depending on a starting time. Moreover, an algorithm of the shortest path problem requires a graph that is abstracted from the road network. With this compilation, attributes such as length, speed limit, number of lanes, function class, or access restrictions have to be added when they are required for the calculation of the cost-function.

However, current routing calculations are often inaccurate because of the underlying static network model and/or the current method of detecting travel times. Firstly, the routing-problem is described on a static graph created upon a road network. Algorithms depending on graphs require compilation of this graph as an input model. Then, the solution is calculated on the graph returning a path through the graph. If that path can be concretized back to the road network, it provides a drivable route. The abstract model, however, is a snapshot of the road network. Due to road construction and closures, the road network changes from time to time and makes the model outdated. Consequently, if a shortest-path solution on an outdated model snapshot differs from a shortest-path solution of an up-to-date model, then the outdated solution is defective and can lead to recommending wrong or illegal traffic movements, which is a severe issue. Further, many of the current solutions require regular and costly updates of the static routing model including as much of the changed infrastructure as possible.

Secondly, there are several issues that bias many of the current travel time estimations, for example, the accuracy of traffic state detection on edges and the accuracy of travel time information on nodes. As for the edges, the detection of current travel time is done by local, stationary detectors embedded on selected locations in the road surface and in some instances mobile detectors. In particular, local detectors capture traffic speed and traffic volume per time interval on road locations without significant impact on intersections. Consequently, resulting travel times over roads and the abstracted model have to be estimated from the local detectors by extrapolation. Since the penetration of mobile detectors is low, the travel times over edges deduced from this data are often imperfect interpolations. As for the nodes, as previously discussed, real travel times and traffic incidents are broadcasted over an information channel called TMC (as standardized by the ISO 14819 family of standards). The TMC has its own network defined where only important and higher-ranked roads are covered. Because local detectors are mostly located in between road segments, the inner-TMC-location edges and the not TMC-mapped interchanges are not supplied with traffic data.

To address this problem, a system 100 of FIG. 1 introduces the capability to provide routing calculations and route guidance based on geographic positioning and/or sensor data from one or more mobile devices independent of map data. As shown in FIG. 1, the system 100 comprises user equipment (UE) 101a-101m (e.g., mobile phones, tablets, phablets, PNDs, etc.) (also collectively referred to as UEs 101) having connectivity to a routing platform 103 via a communication network 105. The UEs 101 also include or have access to one or more applications 107a-107n (also collectively referred to as applications 107). By way of example, the applications 107 may include mapping and/or navigation applications, location-based applications (e.g., enabling location "check-ins"), social networking applications, an Internet browser, etc. In addition, the UEs 101 include one or more sensors 109a-109p (also collectively referred to as sensors 109). In particular, the sensors may include, for example, satellite based positioning system (e.g., a Global Positioning System (GPS) receiver, a Galileo receiver, a GLONASS receiver, etc.) or any other type of geolocation sensor, a compass, an acceleration sensor, a magnetometer, an altitude sensor, or a combination thereof. Moreover, the sensors 109 may also include one or more sensors for non-positional information (e.g., fuel consumption, outside temperature, relative humidity, or vehicle on-board diagnostics sensor readings such as those provided via an on-board diagnostic system (OBD-II) interface, for example).

In one embodiment, the routing platform 103 may include or be associated with at least one probe data database 111. In one example embodiment, the routing platform 103 may exist in whole or in part within a UE 101, or independently and the probe data database 111 may exist in whole or in part within the routing platform 103. By way of example, the probe data database 111 may include, at least in part, one or more probe data samples (i.e., sensor data) including, at least in part, a (possibly anonymized) device identifier (which may even vary over time for a given UE 101 as long as this does not happen too frequently), time (e.g., recording time), latitude, longitude, and possible additional values such as elevation, acceleration, TMC identifiers, or even other, non-positional information such as fuel uptake, temperature levels, etc. In addition, the probe data database 111 also may include one or more historical device tracks from different hours of the day (e.g., rush hour) and/or different days of the week, for example. The probe data database 111 may also include a compilation of travel times associated with one or more legs among one or more device tracks, which can then be used by the system 100 to generate a travel time curve, for example. The probe data database 111 may also include a compilation of other sensor readings or derived values associated with one or more legs among one or more device tracks, which can then be used by the system 100 to generate more complex cost functions and a cost function curve, for example. Also, the probe data database 111 also may include one or more consistency rules, which the system 100 can use to separate colliding sessions and limit the one or more device tracks to the one or more probe data samples that render physically plausible vehicle trajectories.

In one embodiment, the UEs 101 may operate directly with the routing platform 103. Optionally, the UEs 101 may operate with the routing platform 103 in connection with a services platform 113 that can provide additional services to augment the functions of the routing platform 103. In this embodiment, the UEs 101 are connected to a services platform 113 via the communication network 105. In one embodiment, the services platform 113 includes one or more services 115a-115r (also collectively referred to as services 115). The services 115 may include a wide variety of services such as content provisioning services for one or more of the applications 107. By way of example, the services 115 may include mapping or imaging content provisioning services, real-time travel times and traffic incidents broadcast via RDS-TMC (ISO 14819) or other broadcasting methods, one or more cloud-based services, navigation services, etc. In one embodiment, the UEs 101, the services platform 113, and the services 115 also have connectivity to one or more content providers 117a-117s (also collectively referred to as content providers 117). The content providers 117 also may provision a wide variety of content (e.g., daily and hourly travel duration times) to the components of the system 100.

In one embodiment, the routing platform 103, one or more applications 107 (e.g., a mapping and/or navigation application), or a combination thereof may utilize one or more location-based technologies (e.g., GPS, cellular triangulation, Assisted GPS (A-GPS), etc.) to determine a location of a UE 101 and thereby determine one or more probe data samples. For example, a UE 101 may include a GPS receiver 109 to obtain geographic coordinates from the satellites 119 to determine its location. The geographic probe data information may be augmented by other information such as time, acceleration, outside temperature, fuel consumption, etc.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) based data casting, Internet Protocol (IP) suite-based data casting, Transmission Control Protocol (TCP), User Datagram Protocol (UDP), satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, the system 100 processes and/or facilitates a processing of one or more probe data samples (i.e., geographical positioning data) associated with at least one mobile device (e.g., a mobile phone, a tablet, a phablet, a PND, etc.) to determine one or more device tracks (e.g., the one or more device tracks are supposed to be reflections of the at least one mobile device's trajectory, possibly constrained to a time interval or a region in space). More specifically, the one or more probe data samples include, at least in part, an anonymized device identifier (which may vary over time for a given device), time, latitude, longitude, and possibly additional values such as elevation, TMC identifiers, etc. Moreover, probe data samples may also include non-positional information such as, for example, fuel consumption, outside temperature, relative humidity, or on-board diagnostics sensor readings as provided via the OBD-II interface. In one embodiment, while it is contemplated that the at least one device is most likely associated with at least one automobile, in certain embodiments, the at least one device can also be associated with any object moving in one direction (e.g., a pedestrian, a train, a bicycle, a plane, etc.).

In one or more embodiments, the system 100 determines the one or more device tracks based, at least in part, on the respective device session identification (ID), recording time, latitude/longitude, or a combination thereof. In particular, the local temporal consistency of the device session ID enables the system 100 to collate the one or more probe data samples into the one or more device tracks. Moreover, because the at least one mobile device will have a constant session ID for at least a few minutes, the system 100 can group the one or more probe data samples by their session ID, sort them by recording time, and determine a track of the at least one mobile device from the corresponding latitude/longitude values. In one or more embodiments, it is contemplated, that the system 100 can (e.g., by employing a map-reduce programming model) group the one or more probe data samples by their device session ID, and then determine the one or more device tracks based, at least in part, on latitude/longitude values for a given device session identifier, possibly supported by additional data such as recording time. In one or more embodiments, it is contemplated, that the system 100 can (e.g., by employing a map-reduce programming model) group the one or more probe data samples according to the tiles of the at least one tessellation in their vicinity and their device session ID, and then determine the one or more tracks crossing each tile of the at least one tessellation based, at least in part, on latitude/longitude values for a given tile and device session ID, possibly supported by additional data such as recording time. In this approach, a single device session may obviously correspond to multiple device tracks.

In one embodiment, the system 100 determines whether the one or more device tracks are valid based, at least in part, on one or more consistency rules, one or more constraints, one or more plausible travel trajectories, or a combination thereof. In one embodiment, it is contemplated that device session IDs are not always unique (e.g., the same session ID may even be used by different devices during the same period of time). To overcome this limitation, the system 100 employs one or more consistency rules to separate colliding sessions and limit the one or more device tracks to sets of probe data samples that render physically plausible trajectories. For example, the system 100 may cause, at least in part, an implementation of one or more constraints including, at least in part, at least one minimum number of probes per the one or more tracks (e.g., two probes), at least one minimum length of the one or more tracks (e.g., 1000 m), a distance between probes matching a speed of the respective probes, or a combination thereof.

In one or more embodiments, the system 100 can process and/or facilitate a processing of the one or more device tracks to determine at least one tessellation (e.g., a grid, a triangulation, a non-uniform non-polygonal tiling, or a combination thereof), wherein the at least one tessellation is a subdivision of a plane or sphere into one or more tiles and a plurality of segments. More specifically, in one or more embodiments, the system 100 causes, at least in part, a subdivision of the tile edges of the at least one tessellation into segments. In one embodiment, it is contemplated that the plurality of segments may be defined such that they do not overlap (not even at their end points), except at the north and south poles (if the tessellation is a subdivision of the sphere).

In one or more embodiments, the system 100 determines the at least one tessellation, the one or more tiles, the plurality of segments, or a combination thereof based, at least in part, on latitude/longitude coordinates, one or more probe data sampling intervals, or a combination thereof associated with the one or more device tracks. In particular, because not every possible route will have a matching probe data track, the system 100 can combine the one or more device tracks into a network of local spatial equivalence classes of tracks. These local spatial equivalence classes are also referred to as "bundles." For example, in one embodiment, the system 100 can determine the at least one tessellation based, at least in part, on a relatively fine-grained latitude/longitude grid with a mesh size of about 0.002°× 0.002°. In one embodiment, the system 100 determines one or more relationships between one or more of the plurality of segments based, at least in part, on a mapping of the one or more device tracks against the at least one tessellation. By way of example, the one or more relationships may include, at least in part, the shortest path between an origin and a destination. More specifically, if the one or more relationships can be concretized back to a road network by the system 100, then the system 100 can determine with high probability that the one or more relationships represent a navigable route through a network (e.g., a road network). Further, the system 100 can cause, at least in part, the mapping by clipping the one or more device tracks against the one or more tiles of the at least one tessellation and mapping the start/end points of the one or more clipped fragments to the plurality of segments (where applicable).

In one or more embodiments, the system 100 determines one or more legs among the one or more device tracks based, at least in part, on the one or more device tracks intersecting one or more of the plurality of segments. In particular, any continuous portion of any of the one or more device tracks passing through any single tile of the at least one tessellation and not extending beyond that tile is referred to as a leg and intersects at least one segment on either end (which may, however coincide). Since the one or more device tracks do have a direction, the intersected segments on either end can unambiguously be referred to as in-segments and out-segments, respectively, and they may also be referred to as first segments and second segments, respectively. In one embodiment, it is contemplated that the geometry of the one or more device tracks is subject to "fuzziness." By way of example, this means that a device track passing through one tile of at least one tessellation may induce a plurality of legs and/or that a leg may thus be associated with a plurality of first and second segments. In one embodiment, it is contemplated that the more legs that the system 100 can determine between a plurality of first and second segments, the higher the probability that the one or more legs represent a navigable route. Moreover, in one embodiment, it is contemplated that the system 100 can weigh the one or more bundles and/or the one or more legs based, at least in part, on one or more of the one or more legs intersecting multiple segments of the plurality of segments. In particular, these weights are then employed to determine driveability characteristics of a given route (e.g., to help deal with erroneous and/or maliciously generated probe data).

In one embodiment, the system 100 determines one or more bundles among the one or more legs based, at least in part, on at least one of the one or more legs intersecting identical first and second segments of the plurality of segments. By way of example, the legs forming any one of the one or more bundles have at least one identical in/out segment among the plurality of segments. Moreover, in one embodiment, it is contemplated that the geometry of the one or more device tracks is subject to fuzziness. By way of example, this means that any one bundle may be deemed to relate a plurality of first and second segments.

In one or more embodiments, the system 100 determines at least one navigable route through a network (e.g., a road network) based, at least in part, on at least one bundle-to-bundle transition across the one or more tiles. In one embodiment, it is contemplated that contrary to intuition, the edges in the actual routing network (i.e., the navigable routes determined by the system 100) are based, at least in part, on the at least one bundle-to-bundle transition (i.e., each segment coincides with a multitude of edges).

In one embodiment, the system 100 processes and/or facilitates a processing of the one or more bundles to determine at least one cost-function associated with a shortest path route, an estimated travel time, an amount of fuel consumption, a favored road type, a popular route, or a combination thereof. By way of example, as previously discussed, for every bundle a travel time curve can be generated providing the travel times through a bundle at a given time, and a diagram for any cost function can be generated providing the cost for traveling through a bundle at a given time. On times for which there are no legs contained in the one or more bundles, the system 100 can estimate the travel time and/or cost for traveling through that bundle at that time based, at least in part, on other legs using an appropriate algorithm. Consequently, for any starting time, the system 100 can determine the realistic travel time and/or cost function value. More specifically, the system 100 can simulate a traverse over the one or more bundle-to-bundle-transitions from the origin to the destination at any time and can sum up the (possibly estimated) travel times and/or cost function values. Further, for each of the one or more bundle-to-bundle-transitions when simulating a traverse, the system 100 can add the travel time and/or cost function values at the estimated time of arrival from the preceding bundle to the travel time and cost function value, respectively, so that realistic and dynamic travel times and/or cost function values can be determined by the system 100.

Figure 10:
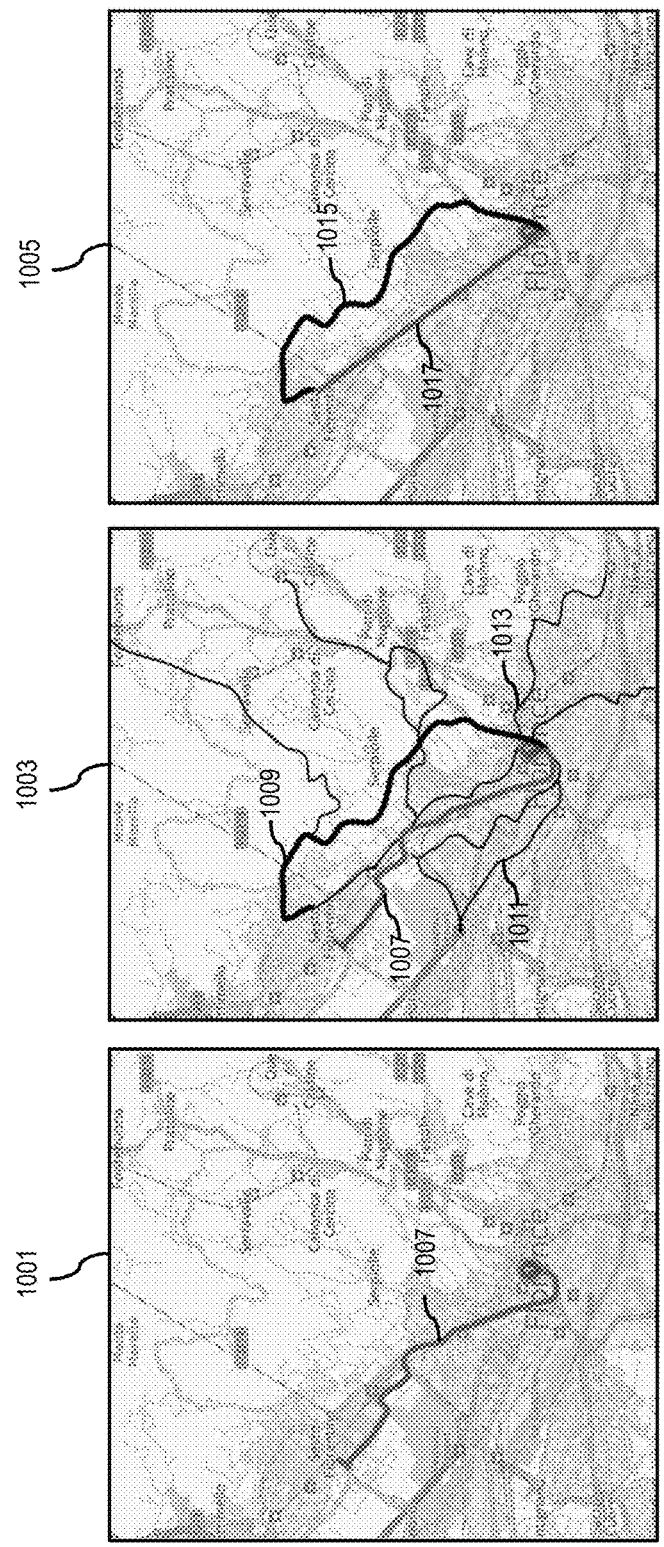
FIG. 10 is a diagram of user interfaces utilized in the processes of FIGS. 3-5, according to various embodiments.

In one or more embodiments, the system 100 causes, at least in part, at least one filtering of the one or more device tracks based, at least in part, on a time of day, a vehicle type, a specific provider, a real-time latency, one or more vehicle trajectory properties (e.g., speed or parametric jitter), or a combination thereof. In particular, as previously discussed, the system 100 can store one or more device tracks from one or more days of a week, for example, in the probe data database 111. Consequently, the system 100 can determine one or more rush hours over that period of time as well as determine one or more routes possibly not reflected by map data. An illustrative example of this new route determination feature is depicted in FIG. 10. In addition, in one embodiment, the system 100 can also cause, at least in part, at least one filtering of the one or more device tracks and their derived legs of one or more bundles of a determined route. As a result, it is contemplated that the system 100 can calculate one or more travel times on that particular found route for different subsets of the one or more device tracks (e.g., by vehicle type, day of the week, etc.).

By way of example, the UEs 101, routing platform 103, the applications 107, the sensors 109, the probe data database 111, the services platform 113, the services 115, the content providers 117, and the satellites 119 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and/or (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, communications can also be supported by hardware protocols such RS232/RS422 and other protocols of similar functionality. For example, such hardware protocols can be employed by combined electrical and data specifications for communicating with positioning receivers including, for instance, NMEA 0183, NMEA 200, etc.

In yet another embodiment, communications protocols can include protocols for emitting positioning signals from satellites and protocols for receiving those signals at receivers. For example, GPS signals adhere to protocols for transmitting/receiving Coarse/Acquisition (C/A) codes and restricted Precision (P) codes. These codes, for instance, can be transmitted using pseudorandom binary sequence (PN or PRN codes). The protocols also cover transmitting/receiving other information such as navigation messages, almanac messages, data updates, and the like.

Figure 2:
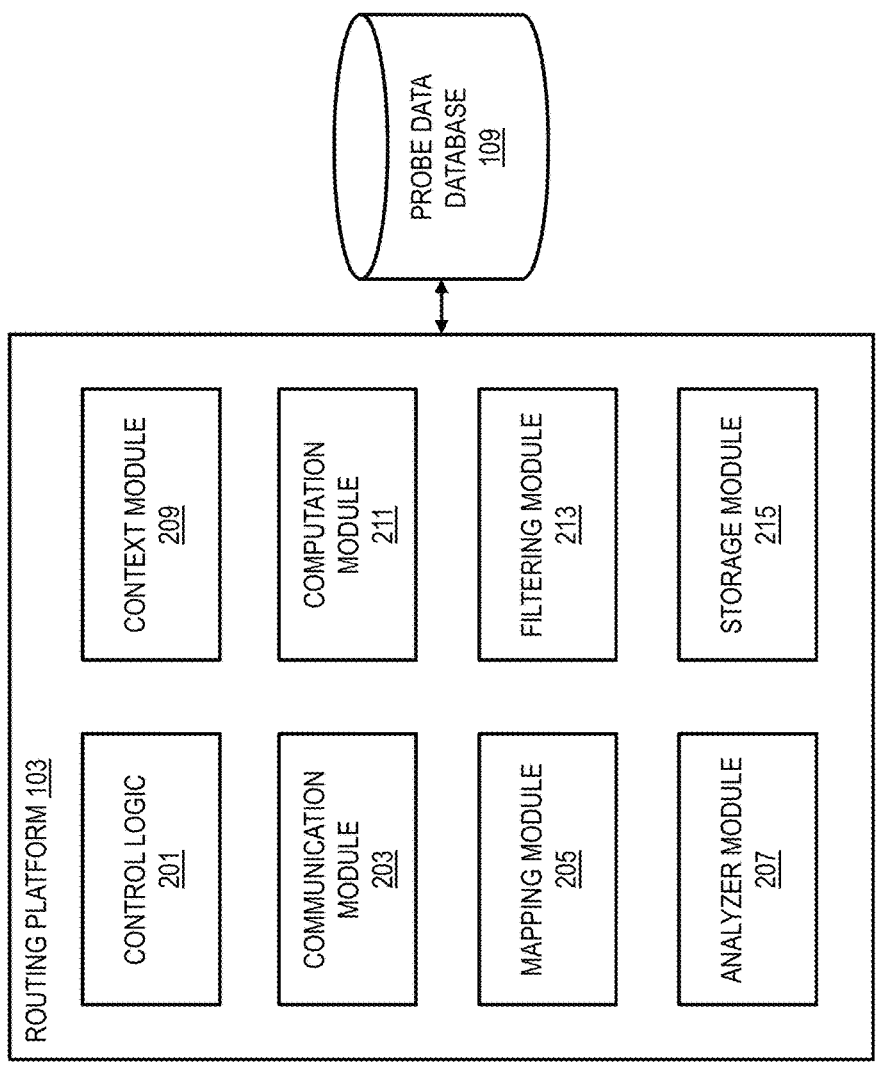
FIG. 2 is a diagram of the components of a routing platform, according to one embodiment.

FIG. 2 is a diagram of the components of routing platform 103, according to one embodiment. By way of example, the routing platform 103 includes one or more components for providing routing calculations and route guidance based on geographic positioning data from one or more mobile devices independent of map data. It is contemplated that the functions of these components may be combined in one or more components or performed by other components of equivalent functionality. In this embodiment, the routing platform 103 includes a control logic 201, a communication module 203, a mapping module 205, an analyzer module 207, a context module 209, a computation module 211, a filtering module 213, and a storage module 215. In addition, the modules are provided by way of illustration of one possible embodiment. Accordingly, in some embodiments, not all modules described herein need to be implemented depending on whether a function attributed to a module is desired.

In one embodiment, the control logic 201 oversees tasks, including tasks performed by the communication module 203, the mapping module 205, the analyzer module 207, the context module 209, the computation module 211, the filtering module 213, and the storage module 215. For example, although the other modules may perform the actual task, the control logic 201 may determine when and how those tasks are performed or otherwise direct the other modules to perform the task.

In one embodiment, the communication module 203 in certain embodiments is used for communication between the UEs 101, the routing platform 103, the applications 107, the sensors 109, the probe data database 111, the services platform 113, the services 115, the content providers 117, and the satellites 119. In one embodiment, the communication module 203 may also be used to communicate commands, requests, data, etc. Further, in one embodiment, the communication module 203 causes, at least in part, the transfer or transmission of the one or more probe data samples from the UEs 101 to the probe data database 111 via the communication network 105.

In one embodiment, the mapping module 205 is used to process and/or facilitate a processing of one or more probe data samples associated with at least one mobile device (e.g., a mobile phone, a tablet, a phablet, a PND, etc.) to determine one or more device tracks. By way of example, the local temporal consistency of device session IDs enables the mapping module 205 to collate the one or more probe data samples into the one or more device tracks. The mapping module 205 may also be used to determine the one or more device tracks based, at least in part, on the respective device session IDs, recording time, latitude/longitude, or a combination thereof associated with the one or more probe data samples. For example, the mapping module 205 can group the one or more probe data samples by their session IDs, sort them by their respective recording times, and determine a track of the at least one mobile device from the corresponding latitude/longitude values.

The analyzer module 207 in certain embodiments is used to determine whether the one or more device tracks are valid based, at least in part, on one or more consistency rules, one or more constraints, one or more plausible travel trajectories, or a combination thereof. For example, the analyzer module 207 can determine that a device track is valid if there are at least two probes per track, if the track is at least 1000 m in length, and/or the distance and duration between probes matches the probe speeds. The analyzer module 207, in connection with the mapping module 205, may also be used to determine one or more relationships between one or more of the plurality of segments based, at least in part, on a mapping of the one or more device tracks against the at least one tessellation. For example, the one or more relationships may include a navigable route, a shortest path, or a combination thereof between the plurality of segments.

In one embodiment, the analyzer module 207 also may be used to determine one or more legs among the one or more device tracks based, at least in part, on the one or more device tracks intersecting one or more of the plurality of segments. The analyzer module 207 may also be used to determine one or more bundles among the one or more legs based, at least in part, on at least one of the one or more legs intersecting identical first and second segments of the plurality of segments. Further, the analyzer module 207 may be used to determine at least one navigable route through a network based, at least in part, on at least one bundle-to-bundle transition across the one or more tiles. For example, the analyzer module 207 can determine the at least one navigable route since the edges in the actual routing network are defined by bundle-to-bundle transitions.

In one or more embodiments, the context module 209 can optionally be used to process and/or facilitate a processing of the one or more device tracks to determine at least one tessellation (e.g., a grid, a triangulation, a non-uniform non-polygonal tiling, or a combination thereof). For example, the content module 209 can determine the at least one tessellation based, at least in part, on an average length of the one or more device tracks. The context module 209 may also be used to determine the at least one tessellation, the one or more tiles, the plurality of segments, or a combination thereof based, at least in part, on latitude/longitude coordinates, one or more probe data sampling intervals, or a combination thereof associated with the one or more device tracks. By way of example, the context module 209 can determine a relatively fine-grained latitude/longitude grid with a mesh size of about 0.002°×0.002° for the at least one tessellation based, at least in part, on typical probe sampling intervals of 10 to 30 seconds. Further, in one example use case, the context module 209 can determine to subdivide the tile edges of the at least one tessellation into segments of about 0.0005°.

In one embodiment, the computation module 211 is used to process and/or facilitate a processing of the one or more bundles to determine at least one cost-function associated with a shortest path route, an estimated travel time, an amount of fuel consumption, a favored road type, a popular route, or a combination thereof. By way of example, the computation module 211 can generate a travel time curve for every bundle based, at least in part, on the travel times between the start and end segments of that bundle. By way of further example, the computation module 211 can determine a popular route based, at least in part, on the thickness of the one or more bundles (i.e., the thicker the bundle, the more popular the route).

In one or more embodiments, the filtering module 213 is used to cause, at least in part, at least one filtering of the one or more device tracks based, at least in part, on a time of day, a vehicle type, a specific provider, a real-time latency, one or more vehicle trajectory properties, or a combination thereof. By way of further example, the filtering module 213 can filter one or more device tracks of one or more days to determine one or more rush hours, for example.

In one embodiment, the storage module 215 is used to manage the storage of one or more probe data samples, one or more historical device tracks, one or more compilations of travel times associated with one or more legs and/or bundles, one or more consistency rules, or a combination thereof stored in the at least one probe data database 111. The storage module 215 may also be used to manage the storage of the compilation of other sensor readings or derived values associated with one or more legs among one or more device tracks.

Figure 3:
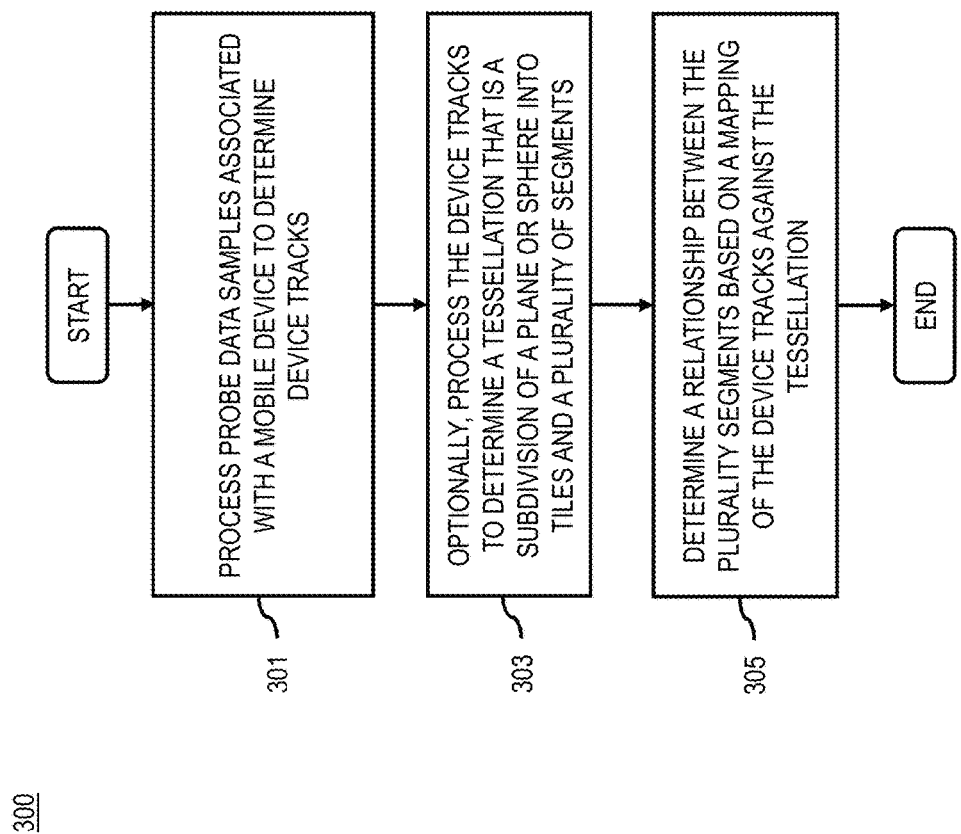
FIGS. 3-5 are flowcharts of processes for providing routing calculations and route guidance based on geographic positioning and/or other sensor data from one or more mobile devices independent of map data, according to one embodiment.
Figure 12:
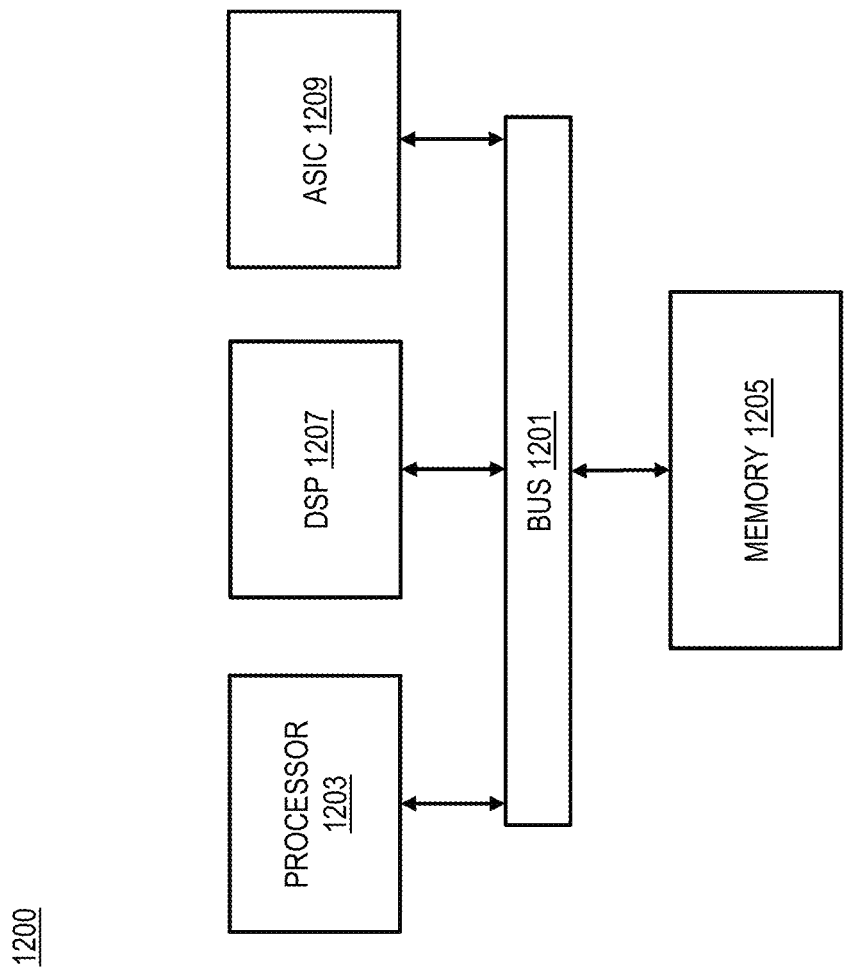
FIG. 12 is a diagram of a chip set that can be used to implement an embodiment of the invention.

FIG. 3 is a flowchart of a process for providing routing calculations and route guidance based on geographic positioning data from one or more mobile devices independent of map data, according to one embodiment. In one embodiment, the routing platform 103 performs the process 300 and is implemented in, for instance, a chip set including a processor and a memory as shown in FIG. 12. In step 301, the routing platform 103 processes and/or facilitates a processing of one or more probe data samples associated with at least one mobile device to determine one or more device tracks. By way of example, the one or more probe data samples include, at least in part, a (possibly anonymized) device identifier (which may vary over time for a given device), time, latitude, longitude, and possibly one or more additional values such as elevation, TMC identifiers, etc. By way of further example, the one or more device tracks are based, at least in part, on at least one track of the at least one mobile device (e.g., a mobile phone, a tablet, a phablet, a PND, etc.) from one or more latitude/longitude values.

In step 303, the routing platform 103 optionally processes and/or facilitates a processing of the one or more device tracks to determine at least one tessellation, wherein the at least one tessellation is a subdivision of a plane or sphere into one or more tiles and a plurality of segments. In particular, since not every possible route will have a matching probe data track, the routing platform 103 can combine one or more device tracks into a network (i.e., creating local spatial equivalence classes of tracks). By way of example, the at least one tessellation may include, at least in part, a grid, a triangulation, a non-uniform non-polygonal tiling, or a combination thereof. As a result, the routing platform 103 may cause, for example, at least in part, a generation of a relatively fine-grained latitude/longitude grid (i.e., a tessellation) with a mesh size of about 0.002°×0.002° based, at least in part, on typical probe data sampling intervals of 10 to 30 seconds and on an average length of the one or more device tracks. Further, in one example use case, the routing platform 103 can cause, at least in part, a subdivision of the tile edges of the at least one tessellation into a plurality of segments of about 0.0005° in size. In one embodiment, the plurality of segments may be defined by the routing platform 103 such that they do not overlap (not even their end points), except at the north and south poles (if the tessellation is a subdivision of the sphere).

In step 305, the routing platform 103 determines one or more relationships between one or more of the plurality of segments based, at least in part, on a mapping of the one or more device tracks against the at least one tessellation. By way of example, the one or more relationships may include, at least in part, the shortest path between an origin (e.g., a home) and a destination (e.g., an office or a restaurant). In particular, if routing platform 103 can concretize the one or more relationships back to a road network, for example, then the routing platform 103 can determine with high probability that the one or more relationships represent a navigable route through the network. By way of further example, the routing platform 103 can map the one or more device tracks against the at least one tessellation by clipping the one or more device tracks against the one or more tiles and clipping the start/end points of the one or more clipped fragments to the plurality of segments (where applicable).

Figure 4:
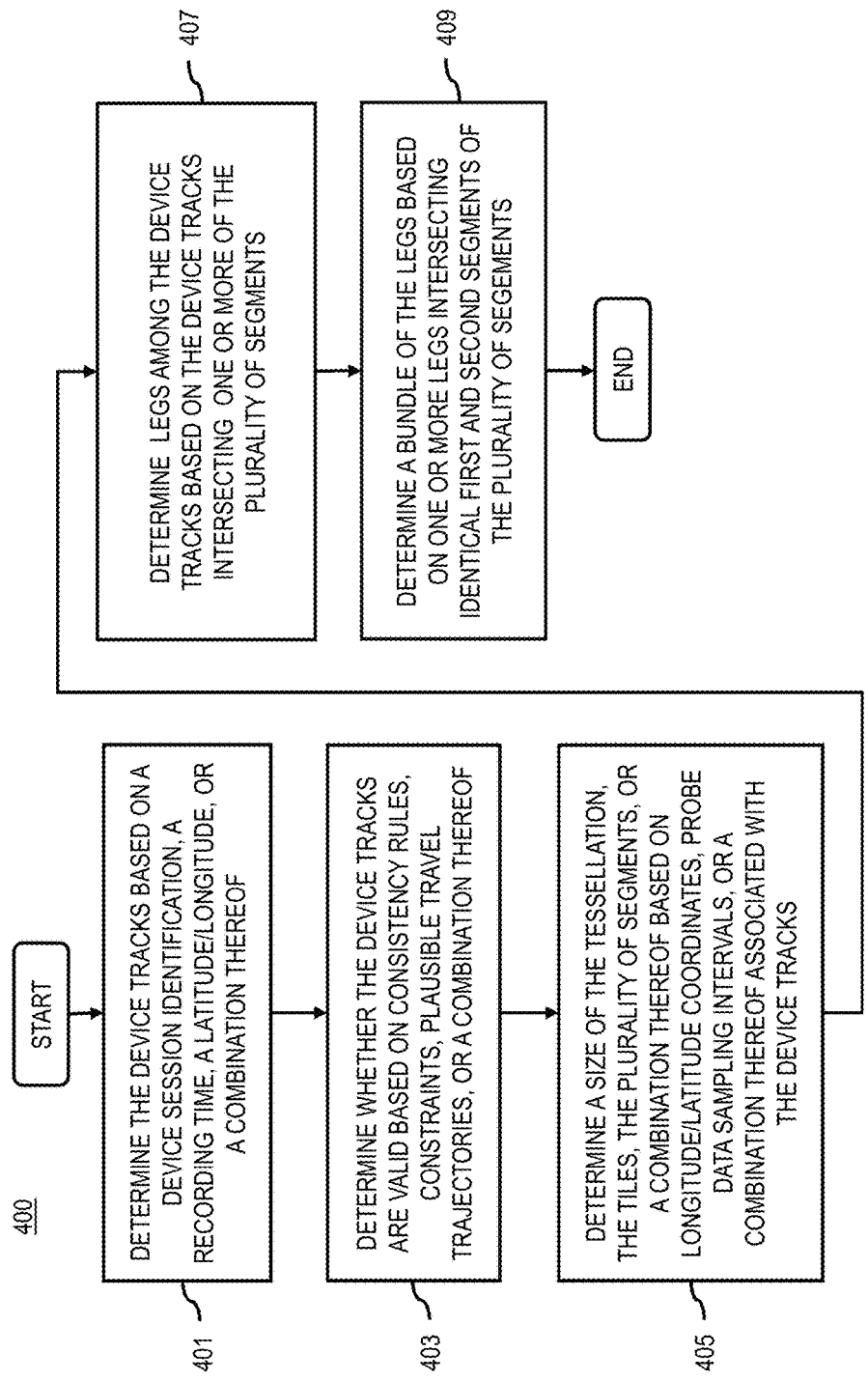

FIG. 4 depicts a process 400 of determining and processing and/or facilitating a processing of one or more device tracks associated with at least one mobile device. In one embodiment, the routing platform 103 performs the process 400 and is implemented in, for instance, a chip set including a processor and a memory as shown in FIG. 12. In step 401, the routing platform 103 determines the one or more device tracks based, at least in part, on the respective device session identification, recording time, latitude/longitude, or a combination thereof associated with the one or more probe data samples. By way of example, as previously discussed, the local temporal consistency of the device session ID enables the routing platform 103 to collate the one or more probe data samples into one or more device tracks. Moreover, because the at least one mobile device (e.g., a mobile phone) will have a constant session ID for at least a few minutes, the routing platform 103 can group the one or more probe data samples by their session ID, sort them by recording time, and determine a track of the at least one from mobile device from the one or more latitude/longitude values. In one or more embodiments, it is contemplated, that the routing platform 103 can group the one or more probe data samples by their device session identifier by employing a map-reduce programming model, for example, and then determine the one or more device tracks based, at least in part, on latitude/longitude values for a given device session identifier, possibly supported by additional data such as recording time. In one or more embodiments, it is contemplated, that the routing platform 103 can group the one or more probe data samples according to the tiles of the at least one tessellation in their vicinity and their device session identifier and then determine the one or more tracks crossing each tile of the at least one tessellation based, at least in part, on latitude/longitude values for a given tile and device session identifier, possibly supported by additional data such as recording time. In this approach, a single device session may obviously correspond to multiple device tracks.

In step 403, the routing platform 103 determines whether the one or more device tracks are valid based, at least in part, on one or more consistency rules, one or more constraints, one or more plausible travel trajectories, or a combination thereof, wherein the one or more legs are further based, at least in part, on the one or more tracks. In one embodiment, it is contemplated that device session IDs are not always unique (e.g., the same session ID may even be used by different devices during the same period of time). To overcome this limitation, the routing platform 103 can cause, at least in part, an implementation of one or more consistency rules to separate colliding sessions and limit the one or more device tracks to one or more sets of probe data samples that render physically plausible trajectories. For example, the routing platform 103 may cause, at least in part, an implementation of one or more constraints including, at least in part, at least one minimum number of probes per the one or more device tracks (e.g., two probes), at least one minimum length of the one or more device tracks (e.g., 1000 m), a distance between probes matching a speed of the respective probes, or a combination thereof. However, even if a sufficiently small proportion of device tracks are reconstructed incorrectly, the routing platform 103 will continue to work correctly as it is able to cope with erroneously or maliciously generated probe data samples (e.g., as caused by sensor errors, programming errors, vandalism, etc.) as long as they are statistically irrelevant.

In step 405, the routing platform 103 determines the at least one tessellation, the one or more tiles, the plurality of segments, or a combination thereof based, at least in part, on latitude/longitude coordinates, one or more probe data sampling intervals, or a combination thereof associated with the one or more device tracks. As previously discussed, in one embodiment, the routing platform 103 can determine the at least one tessellation based, at least in part, on a relatively fine-grained latitude/longitude grid with a mesh size of about 0.002°×0.002°. Further, the routing platform 103 can cause, at least in part, a subdivision of the edges of the at least one tessellation into a plurality of segments of about 0.0005° in size.

In step 407, the routing platform 103 determines one or more legs among the one or more device tracks based, at least in part, on the one or more device tracks intersecting one or more of the plurality of segments. By way of example, the one or more legs are based, at least in part, on the one or more device tracks clipped to the one or more tiles. In one embodiment, it is contemplated that the more legs that the routing platform 103 can determine between a plurality of first and second segments, the higher the probability that the one or more legs represent a navigable route.

In step 409, the routing platform 103 determining one or more bundles among the one or more legs based, at least in part, on at least one of the one or more legs intersecting identical first and second segments of the plurality of segments. By way of example, one of the one or more bundles may have identical in and out segments (i.e., forming a loop); however, the one or more bundles would not include two legs having an identical input, but different output segments (e.g., shaped like a "fork").

Figure 5:
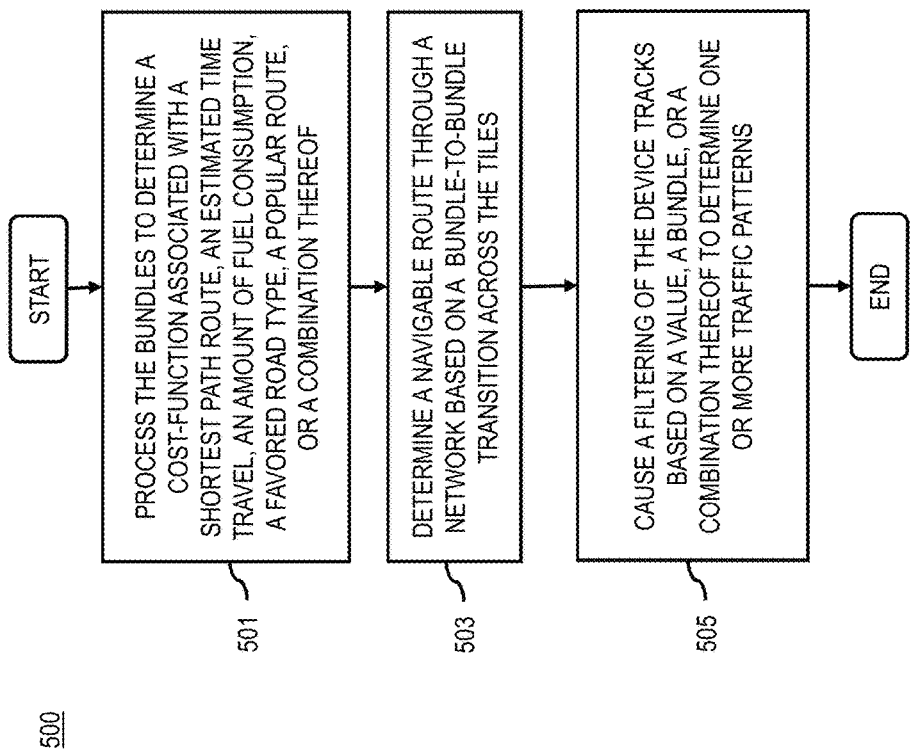

FIG. 5 depicts a process 500 of processing and/or facilitating a processing of the one or more bundles to determine one or more relationships, one or more routes, or a combination thereof associated with a network (e.g., a road network). In one embodiment, the routing platform 103 performs the process 500 and is implemented in, for instance, a chip set including a processor and a memory as shown in FIG. 12. In step 501, the routing platform 103 processes and/or facilitates a processing of the one or more bundles to determine at least one cost-function associated with a shortest path route, an estimated travel time, an amount of fuel consumption, a favored road type, a popular route, or a combination thereof, wherein the one or more relationships are further based, at least in part, on the at least one cost-function. By way of example, as previously discussed, for every bundle a travel time curve can be generated providing the travel times through a bundle at a given time, and a diagram for any cost function can be generated providing the cost for traveling through a bundle at a given time. On times for which there are no legs contained in the one or more bundles, the routing platform 103 can estimate the travel time and/or cost for traveling through that bundle at that time based, at least in part, on other legs using an appropriate algorithm. Consequently, for any starting time, the routing platform 103 can determine the realistic travel time and/or cost function value.

In step 503, the routing platform 103 determines at least one navigable route through a network based, at least in part, on at least one bundle-to-bundle transition across the one or more tiles. By way of example, in one embodiment, it is contemplated that contrary to intuition, the edges in the actual routing network the navigable routes determined by the routing platform 103 are based, at least in part, on the at least one bundle-to-bundle transition (i.e., each segment coincides with a multitude of edges). By way of example, as previously discussed, the routing platform 103 can cause, at least in part, a generation of a travel time curve for each of the one or more bundles, which can then provide a user with travel times through the one or more bundle at a given time. In addition, because the routing platform 103 can determine the one or more routes based, at least in part, on the one or more bundles as opposed to one or more device tracks, the routing platform 103 can prevent the one or more routes from including artificial or illegal turns (e.g., illegal turns by an automobile).

In step 505, the routing platform 103 causes, at least in part, at least one filtering of the one or more device tracks based, at least in part, on a time of day, a vehicle type, a specific provider, a real-time latency, one or more vehicle trajectory properties (such as speed or parametric jitter), or a combination thereof to determine one or more traffic patterns, wherein the one or more relationships are further based, at least in part, on the at least one filtering. As a result, the routing platform 103 can determine travel times at peak traffic hours and thus visible rush hours on a road network, for example, as well as determine one or more routes that are not identified on a map. By way of further example, in one embodiment, the routing platform 103 can also cause, at least in part, at least one filtering of the one or more device tracks and their derived legs of one or more bundles of a determined route. Consequently, it is contemplated that the platform 103 can calculate one or more travel times on that particular found route for different subsets of the one or more device tracks (e.g., by vehicle type, day of the week, etc.).

Figure 6:
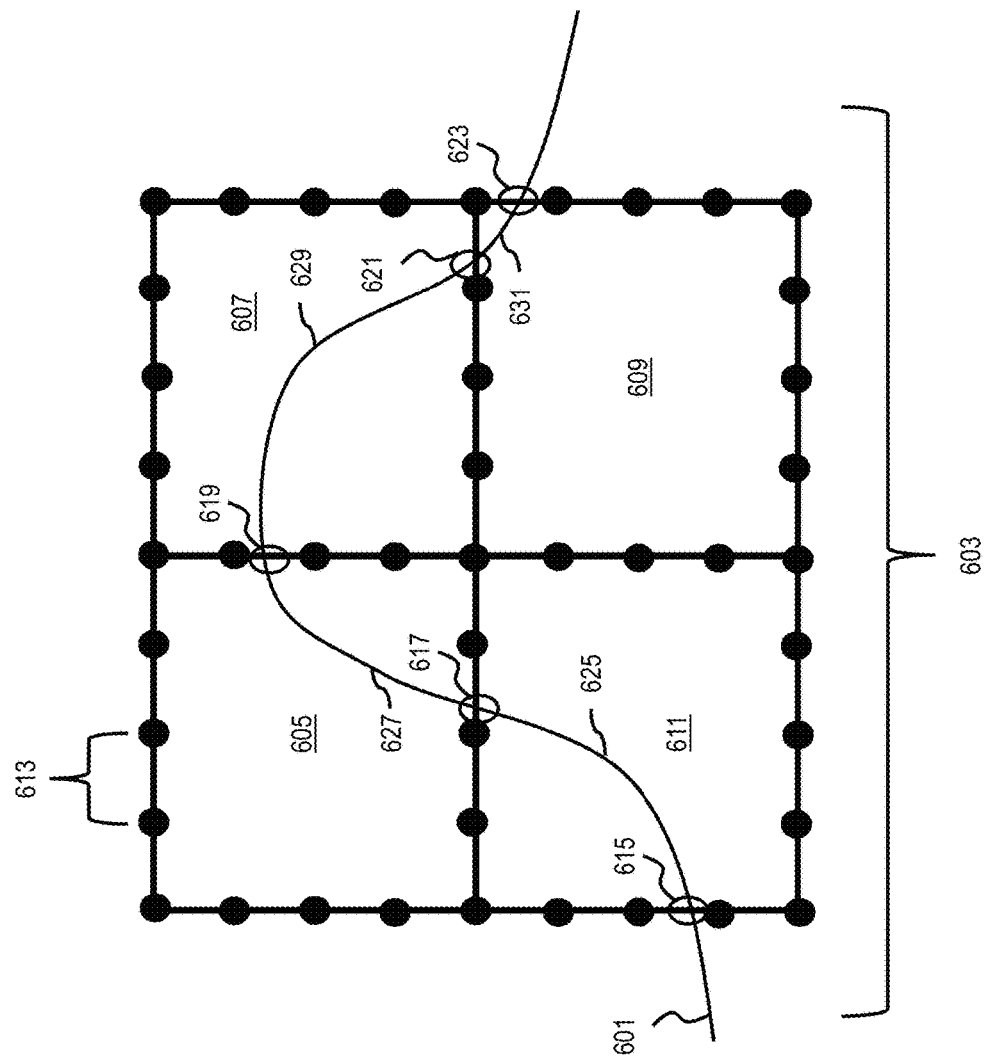
FIG. 6 is a diagram of one or more device tracks and one or more derived legs clipped to at least one tessellation, according to one embodiment.

FIG. 6 is a diagram of one or more device tracks and one or more derived legs clipped to at least one tessellation, according to one embodiment. More specifically, in this example use case, the system 100 causes, at least in part, a clipping of the device track 601 against the at least one tessellation 603, which in this case is a subdivision of the plane by the system 100 into one or more tiles 605, 607, 609, and 611 and a plurality of segments (e.g., segment 613). In one embodiment, when the device track 601 intersects two of the plurality of segments (as depicted by the open circles 615, 617, 619, 621, and 623), the system 100 can determine the respective one or more legs 625, 627, 629, and 631 among the device track 601.

Figure 7:
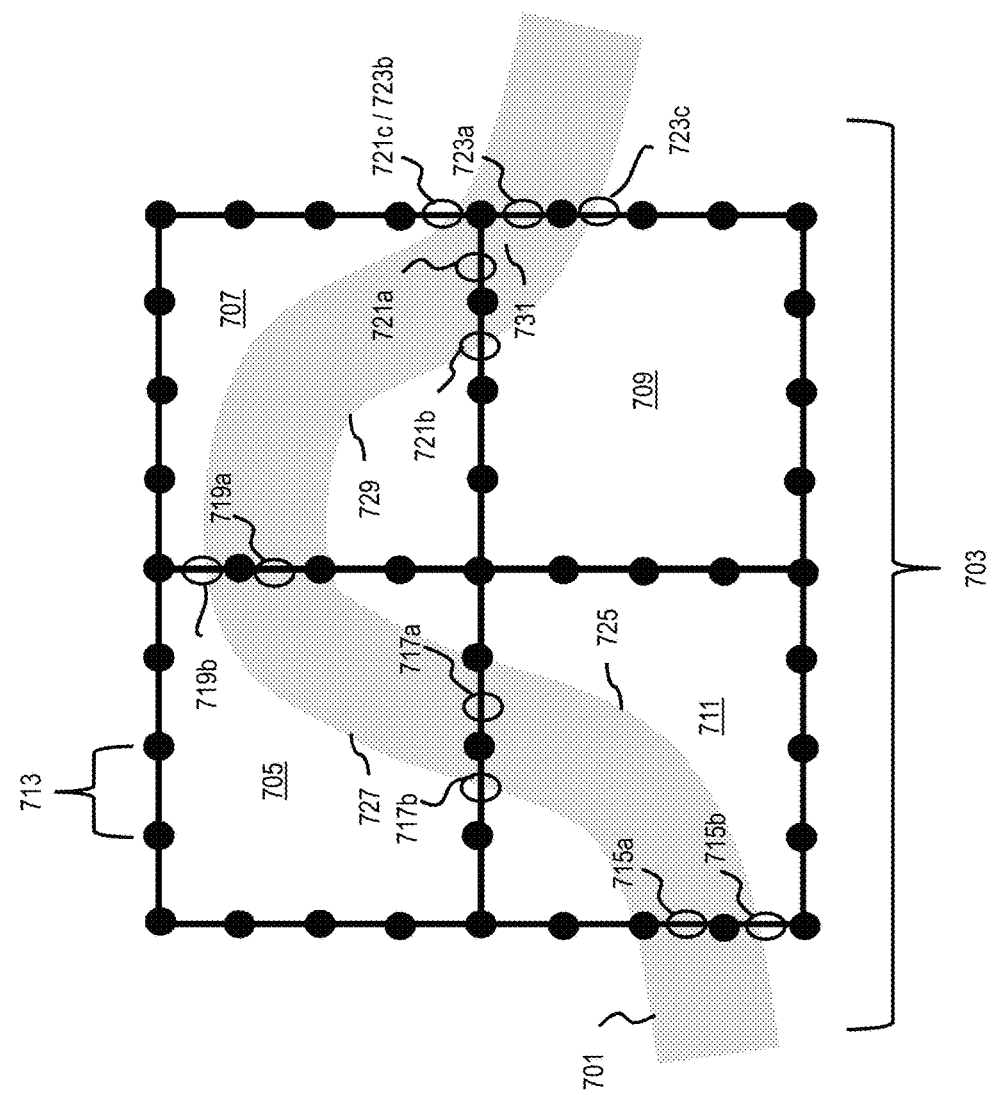
FIG. 7 is a diagram of one or more device tracks and one or more derived legs clipped to at least one tessellation, according one embodiment.

FIG. 7 is a diagram of one or more device tracks and one or more derived legs clipped to at least one tessellation, according to one embodiment. More specifically, in this example use case, it is contemplated that the geometry of the one or more device tracks is subject to fuzziness, and the system 100 causes, at least in part, a mapping of the device track 701 against the at least one tessellation 703, which is a subdivision of the plane by the system 100 into one or more tiles 705, 707, 709, and 711 and a plurality of segments (e.g., segment 713). In one embodiment, when the device track 701 intersects one or more of the plurality of segments (as depicted by the open circles 715a, 715b, 717a, 717b, 719a, 719b, 721a, 721b, 721c, 723a, 723b, and 723c), the system 100 can determine the respective one or more legs 725, 727, 729, and 731 among the device track 701 that are associated with a plurality of first and second segments.

Figure 8:
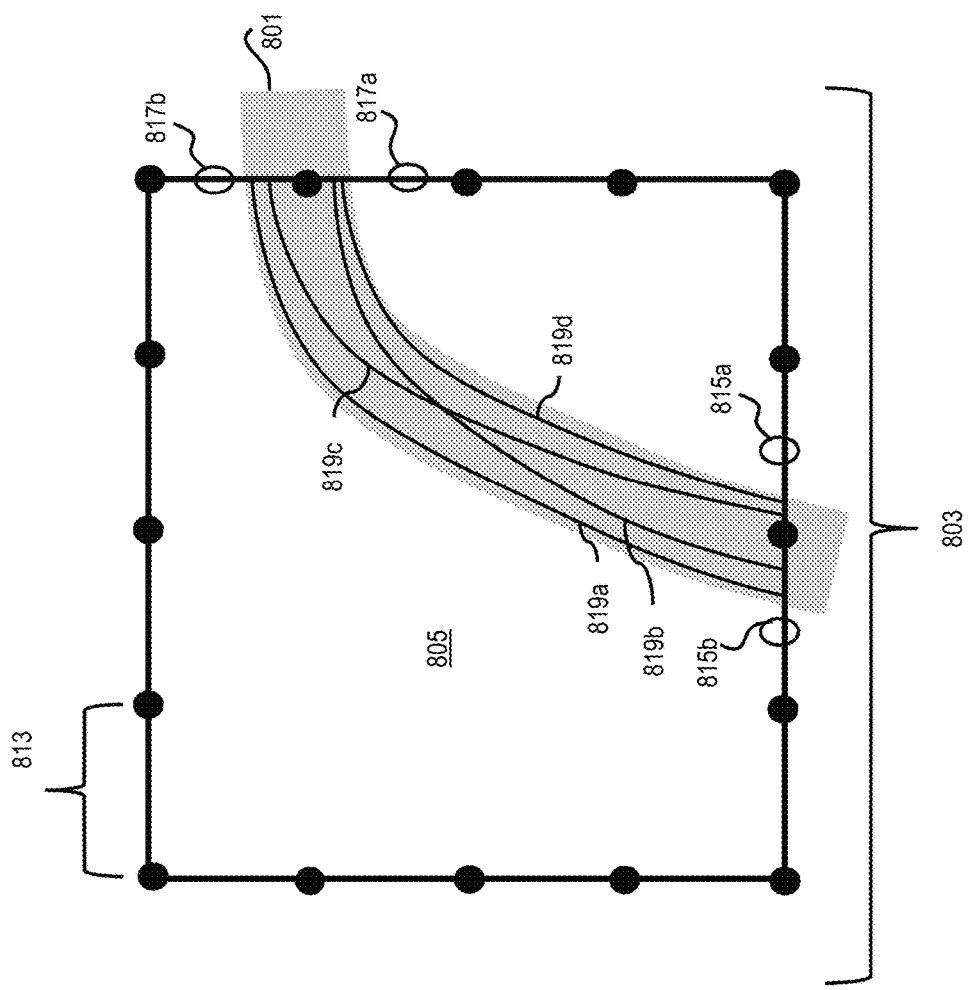
FIG. 8 is also a diagram of one or more device tracks and one or more derived legs clipped to at least one tessellation, according to one embodiment.

FIG. 8 is a diagram of one or more device tracks and one or more derived legs clipped to at least one tessellation, according to one embodiment. More specifically, in this example use case, it is contemplated that the geometry of device tracks is subject to fuzziness, and the system 100 causes, at least in part, a mapping of the device track 801 against the at least one tessellation 803, which is a subdivision of a plane by the system 100 into one or more tiles 805, 807, 809, and 811 and a plurality of segments (e.g., segment 813). In one embodiment, when the device track 801 intersects one or more of the plurality of segments (as depicted by the open circles 815a, 815b, 817a, and 817b, the system 100 can determine the respective one or more legs 819a, 819b, 819c, and 819d among the device track 801 that are associated with a plurality of one first and one second segments.

Figure 9:
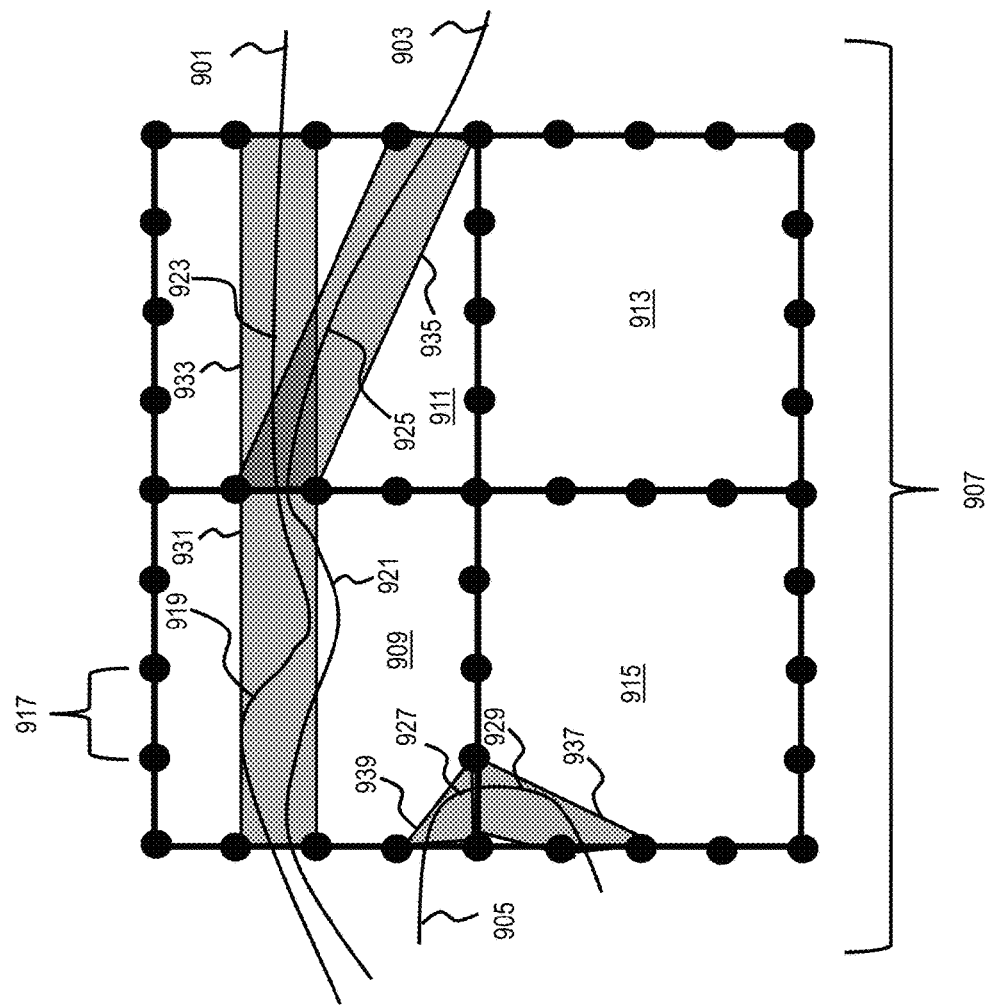
FIG. 9 is a diagram of one or more tracks, one or more legs, and one or more derived bundles mapped against at least one tessellation, according to one embodiment.

FIG. 9 is a diagram of one or more tracks, one or more legs, and one or more derived bundles within a tessellation, according to one embodiment. In particular, in this example use case, the system 100 causes, at least in part, a mapping of one or more device tracks 901, 903, and 905 against the at least one tessellation 907, which in this case is a subdivision of a plane by the system 100 into one or more tiles 909, 911, 913, and 915 and a plurality of segments (e.g., segment 917). As a result of the mapping, the system 100 can determine one or more bundles among the legs 919, 921, 923, 925, 927, and 929. In particular, the system 100 can determine bundle 931 based, at least in part, on legs 919 and 921; bundles 933 and 935 based, at least in part, on legs 923 and 925, respectively; and bundles 937 and 939 based, at least in part, on legs 929 and 927, respectively. Moreover, in one embodiment, the system 100 can determine one or more routes based, at least in part, on at least one bundle-to-bundle transition (e.g., bundles 931 and 933) across the tiles 909 and 911.

FIG. 10 is a diagram of user interfaces utilized in the processes of FIGS. 3-5, according to various embodiments. As shown, the example user interfaces of FIG. 10 include one or more user interface elements and/or functionalities created and/or modified based, at least in part, on information, data, and/or signals resulting from the processes (e.g., 300, 400, and 500) described with respect to FIGS. 3-5. More specifically, FIG. 10 illustrates three interfaces (e.g., 1001, 1003, and 1005) associated with at least one automobile, for example, depicting a road that is routable with probe-data, but has not been rendered on a map. By way of example, interface 1001 depicts a digital map of Florence, Italy, for example, reflecting the current data set of the area provided by a map data provider (e.g., a service 115 and/or a content provider 117) with a quarterly release cycle. Over a period of time (e.g., a week), the system 100 processes and/or facilitates a processing of one or more probe data samples associated with an interface (e.g., interface 1003) to determine one or more device tracks (e.g., tracks 1009, 1011, 1013, etc.). As a result, in one embodiment, the system 100 can determine a new road 1015 based, at least in part, on the track 1009, which is represented relative to a beeline 1017 between an origin and a destination, as depicted in interface 1005.

The processes described herein for providing routing calculations and route guidance based on geographic positioning data from one or more mobile devices independent of map data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
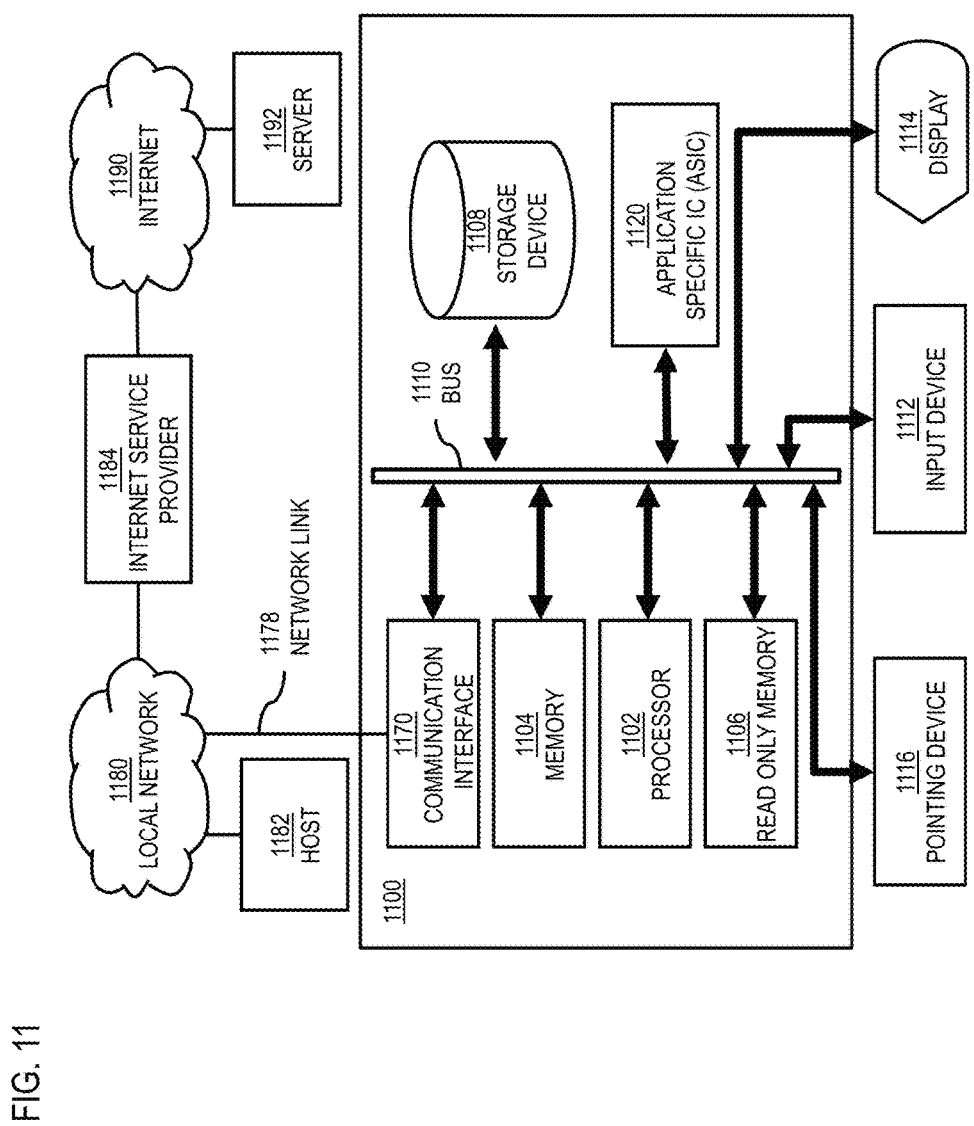
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to provide routing calculations and route guidance based on geographic positioning data from one or more mobile devices independent of map data as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of providing routing calculations and route guidance based on geographic positioning data from one or more mobile devices independent of map data.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to provide routing calculations and route guidance based on geographic positioning data from one or more mobile devices independent of map data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for providing routing calculations and route guidance based on geographic positioning data from one or more mobile devices independent of map data. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost.

Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing routing calculations and route guidance based on geographic positioning data from one or more mobile devices independent of map data, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for providing routing calculations and route guidance based on geographic positioning data from one or more mobile devices independent of map data to the UEs 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to provide routing calculations and route guidance based on geographic positioning data from one or more mobile devices independent of map data as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of providing routing calculations and route guidance based on geographic positioning data from one or more mobile devices independent of map data.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide routing calculations and route guidance based on geographic positioning data from one or more mobile devices independent of map data. The memory 1205 also stores the data associated with or generated by the execution of the inventive steps.

Figure 13:
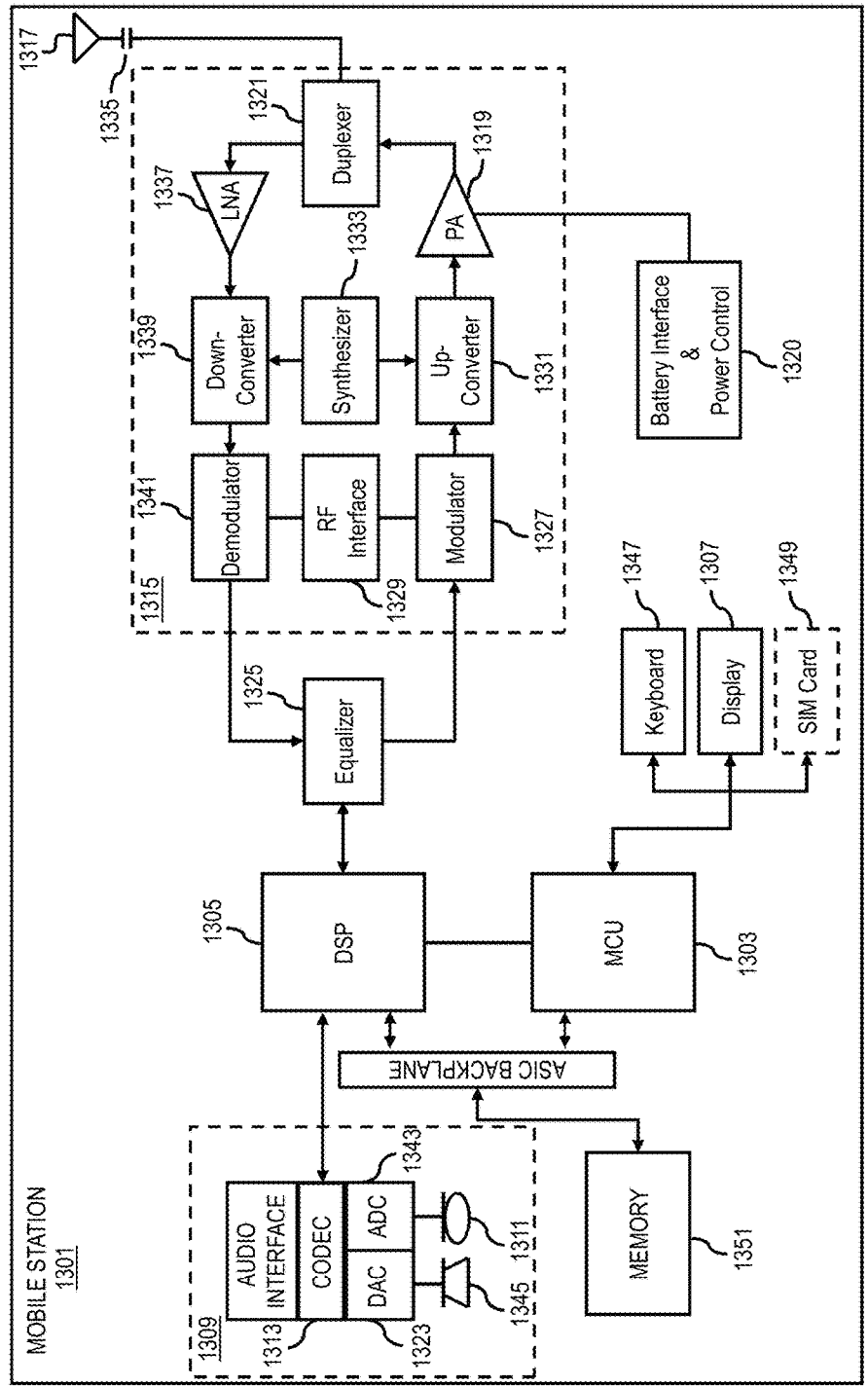
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of providing routing calculations and route guidance based on geographic positioning data from one or more mobile devices independent of map data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of providing routing calculations and route guidance based on geographic positioning data from one or more mobile devices independent of map data. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to provide routing calculations and route guidance based on geographic positioning data from one or more mobile devices independent of map data. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    processing, by an apparatus, one or more probe data samples associated with at least one mobile device to determine one or more device tracks;
    processing, by the apparatus, the one or more device tracks to determine at least one tessellation, wherein the at least one tessellation is a division of a plane or sphere into tiles and each edge of each of the tiles is subdivided into a plurality of segments;
    dividing the one or more device tracks using the tiles, by the apparatus, into one or more legs each of which intersects two of the plurality of segments of a respective one of the tiles;
    determining, by the apparatus, one or more bundles in the respective tile, wherein each of the one or more bundles includes an area enclosed by the two segments on two different edges in the respective tile and by one or more straight lines linking end points of the two segments;
    generating, by the apparatus, a travel time curve for each of the one or more bundles based on a plurality of travel times between the two segments of the respective bundle at a given time without reference to waypoints of the one or more device tracks; and
    determining, by the apparatus, a route made of a subset of the one or more bundles based on the travel time curve and one or more criteria,
        wherein the one or more criteria include one or more cost functions, a shortest path routing, a fastest path routing, one or more fuel consumption functions, one or more favored road types, one or more speed limits, a number of lanes, one or more access restrictions, one or more hours of a day, a day of a week, a real-time latency, one or more vehicle trajectory properties, or a combination thereof.

2. A method of claim 1, further comprising:
    estimating a traverse time over the route at the given time by adding the respective travel time curve.

3. A method of claim 1, further comprising:
    determining the route through a network based, at least in part, on at least one bundle-to-bundle transition across the tiles, wherein the at least one bundle-to-bundle transition includes one of the segments shared by two of the bundles.

4. A method of claim 1, further comprising:
determining the at least one tessellation, the one or more tiles, the plurality of segments, or a combination thereof based, at least in part, on latitude/longitude coordinates, one or more probe data sampling intervals, or a combination thereof associated with the one or more device tracks.

5. A method of claim 1, further comprising:
weighing the one or more bundles based, at least in part, on one or more of the one or more legs intersecting multiple segments of the plurality of segments, wherein the route is further determined based on the weighting, wherein the one or more probe data samples include, at least in part, a device session identification, a recording time, a latitude/longitude, or a combination thereof associated with the at least one mobile device.

6. A method of claim 5, further comprising:
filtering off erroneous and maliciously generated probe data samples via the weighting; and
determining the one or more device tracks based, at least in part, on the respective device session identification, recording time, latitude/longitude, or a combination thereof associated with the one or more probe data samples.

7. A method of claim 1, further comprising:
determining whether the one or more device tracks are valid based, at least in part, on one or more consistency rules, one or more constraints, one or more plausible travel trajectories, or a combination thereof,
wherein the one or more legs are further based, at least in part, on the one or more tracks being valid.

8. A method of claim 7, wherein the one or more constraints include, at least in part, at least one minimum number of probes per the one or more tracks, at least one minimum length of the one or more tracks, a distance and duration between probes matching a speed of the probes, or a combination thereof.

9. A method of claim 1, further comprising:
processing the one or more bundles to determine at least one cost-function associated with a shortest path route, an estimated travel time, an amount of fuel consumption, a favored road type, a popular route, or a combination thereof,
wherein the route is further based, at least in part, on the at least one cost-function.

10. A method of claim 1, further comprising:
filtering the one or more device tracks based, at least in part, on a time of day, a vehicle type, a specific provider, a real-time latency, one or more vehicle trajectory properties, or a combination thereof to determine one or more traffic patterns,
wherein the route is further based, at least in part, on the filtering.

11. An apparatus comprising:
at least one processor; and
at least one memory including computer program code for one or more programs,
the at least one memory and the computer program code configured to, with the at least one processor, cause the apparatus to perform at least the following,
process one or more probe data samples associated with at least one mobile device to determine one or more device tracks;
process the one or more device tracks to determine at least one tessellation, wherein the at least one tessellation is a division of a plane or sphere into tiles and each edge of each of the tiles is subdivided into a plurality of segments;
divide the one or more device tracks using the tiles into one or more legs each of which intersects two of the plurality of segments of a respective one of the tiles;
determine one or more bundles in the respective tile, wherein each of the one or more bundles includes an area enclosed by the two segments on two different edges in the respective tile and by one or more straight lines linking end points of the two segments;
generate a travel time curve for each of the one or more bundles based on a plurality of travel times between the two segments of the respective bundle at a given time without reference to waypoints of the one or more device tracks; and
determine a route made of a subset of the one or more bundles based on the travel time curve and one or more criteria,
wherein the one or more criteria include one or more cost functions, a shortest path routing, a fastest path routing, one or more fuel consumption functions, one or more favored road types, one or more speed limits, a number of lanes, one or more access restrictions, one or more hours of a day, a day of a week, a real-time latency, one or more vehicle trajectory properties, or a combination thereof.

12. An apparatus of claim 11, wherein the apparatus is further caused to:
estimate a traverse time over the route at the given time by adding the respective travel time curve.

13. An apparatus of claim 11, wherein the apparatus is further caused to:
determine at least one navigable route through a network based, at least in part, on at least one bundle-to-bundle transition across the tiles, wherein the at least one bundle-to-bundle transition includes one of the segments shared by two of the bundles.

14. An apparatus of claim 11, wherein the apparatus is further caused to:
determine the at least one tessellation, the one or more tiles, the plurality of segments, or a combination thereof based, at least in part, on latitude/longitude coordinates, one or more probe data sampling intervals, or a combination thereof associated with the one or more device tracks.

15. An apparatus of claim 11, wherein the one or more probe data samples include, at least in part, a device session identification, a recording time, a latitude/longitude, or a combination thereof associated with the at least one mobile device.

16. An apparatus of claim 15, wherein the apparatus is further caused to:
determine the one or more device tracks based, at least in part, on the respective device session identification, recording time, latitude/longitude, or a combination thereof associated with the one or more probe data samples.

17. An apparatus of claim 11, wherein the apparatus is further caused to:
determine whether the one or more device tracks are valid based, at least in part, on one or more consistency rules, one or more constraints, one or more plausible travel trajectories, or a combination thereof,
wherein the one or more legs are further based, at least in part, on the one or more tracks being valid.

18. An apparatus of claim 17, wherein the one or more constraints include, at least in part, at least one minimum number of probes per the one or more tracks, at least one minimum length of the one or more tracks, a distance and duration between probes matching a speed of the probes, or a combination thereof.

19. An apparatus of claim 11, wherein the apparatus is further caused to:
process the one or more bundles to determine at least one cost-function associated with a shortest path route, an estimated travel time, an amount of fuel consumption, a favored road type, a popular route, or a combination thereof,
wherein the route is further based, at least in part, on the at least one cost-function.

20. An apparatus of claim 11, wherein the apparatus is further caused to:
filter the one or more device tracks based, at least in part, on a time of day, a vehicle type, a specific provider, a real-time latency, one or more vehicle trajectory properties, or a combination thereof to determine one or more traffic patterns,
wherein the route is further based, at least in part, on the filtering.

* * * * *